(12) United States Patent
Kawakami et al.

(10) Patent No.: US 11,139,468 B2
(45) Date of Patent: Oct. 5, 2021

(54) CATHODE ACTIVE MATERIAL, CATHODE MIXTURE, METHOD FOR PRODUCING CATHODE ACTIVE MATERIAL, METHOD FOR PRODUCING CATHODE, AND METHOD FOR PRODUCING OXIDE SOLID-STATE BATTERY

(71) Applicant: TOYOTA JIDOSHA KABUSHIKI KAISHA, Toyota (JP)

(72) Inventors: Masatsugu Kawakami, Nagaizumi-cho (JP); Shingo Ohta, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 132 days.

(21) Appl. No.: 16/127,445

(22) Filed: Sep. 11, 2018

(65) Prior Publication Data

US 2019/0103603 A1     Apr. 4, 2019

(30) Foreign Application Priority Data

Sep. 29, 2017     (JP) .............................. JP2017-191520

(51) Int. Cl.
    *H01M 4/1391*     (2010.01)
    *H01M 4/131*     (2010.01)
    (Continued)

(52) U.S. Cl.
    CPC ......... *H01M 4/1391* (2013.01); *H01M 4/131* (2013.01); *H01M 4/525* (2013.01);
    (Continued)

(58) Field of Classification Search
    CPC .. H01M 4/505; H01M 4/525; H01M 10/0562; H01M 2004/028; H01M 4/1391;
    (Continued)

(56) References Cited

U.S. PATENT DOCUMENTS

| | | | |
|---|---|---|---|
| 2002/0141937 A1 | 10/2002 | Howard, Jr. et al. | |
| 2007/0248883 A1* | 10/2007 | Oda ....................... | C01G 53/42 |
| | | | 429/231.1 |

(Continued)

FOREIGN PATENT DOCUMENTS

| | | |
|---|---|---|
| CN | 101904040 A | 12/2010 |
| CN | 102770391 A | 11/2012 |

(Continued)

OTHER PUBLICATIONS

Communication dated Nov. 18, 2019 from the United States Patent and Trademark Office in U.S. Appl. No. 15/837,119.

(Continued)

*Primary Examiner* — Tabassom Tadayyon Eslami
(74) *Attorney, Agent, or Firm* — Sughrue Mion, PLLC

(57) ABSTRACT

Disclosed is a cathode active material that can lower sintering temperature, the cathode active mated al including a particle of a lithium containing composite oxide having a layered rock-salt crystalline phase, wherein the layered rock-salt crystalline phase is partially deficient in lithium, a percentage of deficient lithium in the layered rock-salt crystalline phase in a surface portion of the particle is higher than that in the layered rock-salt crystalline phase inside the particle, and the particle includes two phases that are different in lattice constant as the layered rock-salt crystalline phase.

15 Claims, 18 Drawing Sheets

(51) Int. Cl.
    *H01M 10/0525*    (2010.01)
    *H01M 10/0562*    (2010.01)
    *H01M 4/62*    (2006.01)
    *H01M 10/058*    (2010.01)
    *H01M 4/525*    (2010.01)
    *H01M 10/052*    (2010.01)
    *H01M 4/02*    (2006.01)

(52) U.S. Cl.
    CPC ........... *H01M 4/62* (2013.01); *H01M 10/052* (2013.01); *H01M 10/058* (2013.01); *H01M 10/0525* (2013.01); *H01M 10/0562* (2013.01); *H01M 2004/028* (2013.01); *H01M 2300/0071* (2013.01); *H01M 2300/0077* (2013.01)

(58) Field of Classification Search
    CPC ...... H01M 4/0525; H01M 4/62; H01M 4/052; H01M 4/131; H01M 4/364; H01M 4/31; C01G 53/40; C01G 53/00
    USPC ......................................... 429/223, 224, 231
    See application file for complete search history.

(56) References Cited

U.S. PATENT DOCUMENTS

| | | | |
|---|---|---|---|
| 2009/0011335 A1* | 1/2009 | Takeda | C01G 45/006 429/223 |
| 2009/0092903 A1* | 4/2009 | Johnson | H01M 4/0471 429/322 |
| 2011/0003212 A1 | 1/2011 | Sato et al. | |
| 2011/0177397 A1 | 7/2011 | Ogasa | |
| 2012/0015234 A1* | 1/2012 | Iwaya | H01M 4/62 429/152 |
| 2012/0305391 A1 | 12/2012 | Kim et al. | |
| 2013/0247363 A1* | 9/2013 | Nelson | H01M 4/32 29/623.1 |
| 2013/0252085 A1* | 9/2013 | Nelson | C01G 53/50 429/206 |
| 2014/0060723 A1 | 3/2014 | Herle et al. | |
| 2016/0104886 A1 | 4/2016 | Tsunozaki | |
| 2016/0172658 A1 | 6/2016 | Donnelly et al. | |
| 2017/0179521 A1* | 6/2017 | Sakamoto | H01M 4/0471 |
| 2018/0212246 A1 | 7/2018 | Kawakami et al. | |
| 2018/0331361 A1* | 11/2018 | Nelson | H01M 4/525 |

FOREIGN PATENT DOCUMENTS

| | | |
|---|---|---|
| CN | 104220381 A | 12/2014 |
| CN | 104541401 A | 4/2015 |
| CN | 105378986 A | 3/2016 |
| JP | 2011-150817 A | 8/2011 |
| JP | 2012-146443 A | 8/2012 |
| JP | 2012-169066 A | 9/2012 |
| WO | 2011/086649 A1 | 7/2011 |
| WO | 2014/036090 A1 | 3/2014 |

OTHER PUBLICATIONS

Communication dated May 14, 2020 from the United States Patent and Trademark Office in U.S. Appl. No. 15/837,119.

Communication dated Aug. 25, 2020 from the United States Patent and Trademark Office in U.S. Appl. No. 15/837,119.

* cited by examiner

CATHODE ACTIVE MATERIAL, CATHODE MIXTURE, METHOD FOR PRODUCING CATHODE ACTIVE MATERIAL, METHOD FOR PRODUCING CATHODE, AND METHOD FOR PRODUCING OXIDE SOLID-STATE BATTERY

FIELD

The present application discloses cathode active material, a cathode mixture, a method for producing cathode active material, a method for producing a cathode, and a method for producing an oxide solid-state battery.

BACKGROUND

It is believed that in an oxide solid-state battery in which a solid oxide is used as an electrolyte, the interface resistance between a cathode and an oxide solid electrolyte layer, the interface resistance between the oxide solid electrolyte layer and an anode, and so on can be reduced by joining the cathode, oxide solid electrolyte layer, and anode by sintering. On the other hand, a solid-state battery whose layers cannot be joined by sintering, like a sulfide solid-state battery in which a sulfide solid electrolyte that is easy to suffer heat deterioration is used, is, in the present circumstances, pressurized using a restraining member, and thereby contact interfaces of battery material are increased, and interface resistance is reduced. That is, an oxide solid-state battery does not need any member for restraining a cathode, an oxide solid electrolyte layer, and an anode, and the energy density of the battery as a whole can be easily increased, which is advantageous compared to other solid-state batteries.

A lithium containing composite oxide having a layered rock-salt crystalline phase can be applied as cathode active material for an oxide solid-state battery. A cathode of an oxide solid-state battery can be made by sintering particles of such a composite oxide. For example. Patent Literature 1 discloses a method of filling a powder of $LiCoO_2$ which has a layered rock-salt crystalline phase into a mold, lowering the pressure inside the mold, and carrying out pressure sintering at a temperature of equal to or higher than 800° C. and equal to or lower than 880° C.

CITATION LIST

Patent Literature

Patent Literature 1: WO 2011/086649 A1

SUMMARY

Technical Problem

The inventors of the present application attempted to join a cathode and an oxide solid electrolyte layer by sintering, using the technique of Patent Literature 1, upon producing an oxide solid-state battery. Specifically, they attempted to sinter lithium containing composite oxide particles having layered rock-salt crystalline phases each other, oxide solid electrolyte particles each other, and the composite oxide particles and the oxide solid electrolyte particles at the same time, by layering a layer of the composite oxide particles, and a layer of the oxide solid electrolyte particles, and heating the layers while pressurizing the layers.

Heating at high temperature as disclosed in Patent Literature 1 is necessary for sintering lithium containing composite oxide particles having layered rock-salt crystalline phases. The inventors of the present application encountered such a new problem that when composite oxide particles are attempted to be sintered at such high temperature, there is a case that the composite oxide particles chemically react with oxide solid electrolyte articles before the composite oxide particles are sintered, and a high resistance layer forms over particle interfaces. That is, it was d that sintering temperature of a cathode has to be as low as possible for producing an oxide solid-state battery by sintering the cathode and an oxide solid electrolyte layer. If sintering temperature of a cathode can be lowered, it is advantageous even in view of energy efficiency.

According to the new findings of the inventors of the present application, it is effective to acid-treated cathode active material with a lithium compound whose melting point is lower than that of the cathode active material for lowering sintering temperature of a cathode. However, the inventors encountered such a new problem that when cathode active material is heat-treated after acid-treated, a cathode can be sintered at low temperature but the cathode active material might decompose.

Solution to Problem

The present application discloses a cathode active material that comprises a particle of a lithium containing composite oxide having a layered rock-salt crystalline phase, wherein the layered rock-salt crystalline phase is partially deficient in lithium, a percentage of deficient lithium in the layered rock-salt crystalline phase in a surface portion of the particle is higher than that in the layered rock-salt crystalline phase inside the particle, and the particle includes two phases that are different in lattice constant as the layered rock-salt crystalline phase, as one means for solving the above problem.

"A particle of a lithium containing composite oxide that has a layered rock-salt crystalline phase" is a particle (powder) of a composite oxide that contains lithium as a constituent element of a layered rock-salt crystalline phase. When this particle is subjected to X ray diffraction, diffraction peaks corresponding to the layered rock-salt crystalline phase are confirmed.

"A surface portion of the particle" refers to a surface of the particle, and the vicinity of the surface. Specifically, as shown in FIG. 18, when the particle is observed with a transmission electron microscope to obtain a two-dimensional image, a region X when $a_1/(a_1+a_2)$ is no more than 0.1 is referred to as the surface portion, where an area of the region X that is defined by the surface of the particle and a predetermined depth from the surface is $a_1$, and an area of the whole of the particle is $a_1+a_2$, on the two-dimensional image of the particle.

"Inside the particle" refers to a deeper portion (inner portion) than "a surface portion of the particle".

"A percentage of deficient lithium in the layered rock-salt crystalline phase in a surface portion of the particle is higher than that in the layered rock-salt crystalline phase inside the particle" can be confirmed by, for example, after grasping the composition of the layered rock-salt crystalline phase included in the particle by X-ray diffraction and/or elementary analysis, observing the particle with a transmission electron microscope to obtain a two-dimensional image of the particle, and measuring lattice constants of the layered rock-salt crystalline phase included in the particle using electron diffraction. Generally, when the layered rock-salt crystalline phase is deficient in lithium, a layered rock-salt crystal lattice expands in the c-axis direction. That is, when a c-axis lattice constant of the layered rock-salt crystalline phase in the surface portion of the particle is larger than that inside the particle as a result of the comparison thereof, it can be determined that "a percentage of deficient lithium in the layered rock-salt crystalline phase in a surface portion of the particle is higher than that in the layered rock-salt crystalline phase inside the particle".

"A percentage of deficient lithium" refers to the mean value of the amounts of deficient lithium. That is, the percentage of deficient lithium in the layered rock-salt crystalline phase in the surface portion of the particle refers to the average of the amounts of deficient lithium in the whole of the surface portion of the particle, and the percentage of deficient lithium in the layered rock-salt crystalline phase inside the particle refers to the average of the amounts of deficient lithium in the whole of the inside of the particle. Thus, when the percentage of deficient lithium in the surface portion of the particle as a whole is more than that inside the particle as a whole even if there locally exist portions in the surface portion of the particle where the amount of deficient lithium is smaller than that inside the particle, it is determined that "a percentage of deficient lithium in the layered rock-salt crystalline a phase in a surface portion of the particle is higher than that in the layered rock-salt crystalline phase inside the particle".

"The particle includes two phases that are different in lattice constant as the layered rock-salt crystalline phase" means, in other words, that two separate peaks which are derived from the same kind of the crystal faces of the layered rock-salt crystalline phase are confirmed (both two peaks are the local maximums, and are convex upward) when the particle is subjected to X-ray diffraction measurement.

The present application discloses a cathode mixture comprising: the cathode active material of this disclosure; and a lithium compound whose melting point is lower than that of the cathode active material, as one means for solving the above problem.

"A cathode mixture" has only to comprise at least the cathode active material, and the lithium compound of a low melting point, and may also comprise other optional components as needed.

In the cathode mixture of this disclosure, the lithium compound is preferably at least one selected from the group consisting of lithium nitrate, lithium formate, lithium acetate, and lithium hydroxide.

The present application discloses a method for producing a cathode active material, the method comprising: contacting a particle of a lithium containing composite oxide having a layered rock-salt crystalline phase with an acid solution, and extracting lithium from a surface of the particle to the acid solution, to obtain a cathode active material that includes two phases different in lattice constant as the layered rock-salt crystalline phase, as one means for solving the above problem.

"An acid solution" has only to be able to extract lithium the surface of the particle. Solvent that is a constituent of the solution may be either water, or organic solvent. An acid contained in the solution may be either an organic or inorganic acid.

In the method for producing a cathode active material of this disclosure, a ratio (A1/B1) of a number of hydrogen ions included in the acid solution (A1) to a number of lithium atoms included in the particle before the particle is contacted with the acid solution (B1) is preferably than $\frac{1}{3}$.

"A number of hydrogen ions included in the acid solution (A1)" can be calculated from pH of the acid solution. That is, let pH of the acid solution be n, and the hydrogen ion concentration in the acid solution is $10^{-n}$ mol/L, which is multiplied by the amount of the acid solution to calculate A1.

"A number of lithium atoms included in the particle before the particle is contacted with the acid solution (B1)" refers to the total number of lithium atoms included in the particles (granular material) that are contacted with the acid solution. That is, when a plurality of the particles are contacted with the acid solution, B1 is the total number of lithium atoms included in the whole of these plurality of the particles.

In the method for producing a cathode active material of this disclosure, a ratio (B2/B1) of a number of lithium atoms included in the particle after the particle is contacted with the acid solution (B2) to a number of the lithium atoms included in the particle before the particle is contacted with the acid solution (B1) is preferably no less than 0.9 and less than 1.0

"A number of lithium atoms included in the particle after the particle is contacted with the acid solution (B2)" refers to the total number of lithium atoms included in the particles (granular material) after the particles are contacted with the acid solution. That is, when a plurality of the particles are contacted, B2 is the total number of lithium atoms included in the whole of these plurality of the particles as described above.

The present application discloses a method for producing a cathode, comprising: mixing the cathode active material of this disclosure with a lithium compound whose melting point is lower than that of the cathode active material, to obtain a cathode mixture; and heating the cathode mixture at a temperature of no less than the melting point of the lithium compound, and sintering the cathode mixture, as one means for solving the above problem.

The present application discloses a method for producing a cathode, comprising: producing a cathode active material according to the method for producing a cathode active material of this disclosure; mixing the cathode active material with a lithium compound whose melting point is lower than that of the cathode active material, to obtain a cathode mixture; and heating the cathode mixture at a temperature of no less than the melting point of the lithium compound, and sintering the cathode mixture, as one means for solving the above problem.

In the method for producing a cathode of this disclosure, the lithium compound is preferably at least one selected from the group consisting of lithium nitrate, lithium formate, lithium acetate, and lithium hydroxide.

In the method for producing a cathode of this disclosure, in said sintering the cathode mixture, the cathode mixture is preferably heated either while or after pressurized.

The present application discloses a method for producing an oxide solid-state battery, comprising: mixing the cathode active material of this disclosure with a lithium compound whose melting point is lower than that of the cathode active material, to obtain a cathode mixture; layering a layer that consists of the cathode mixture, and a layer of an oxide solid electrolyte, to obtain a laminate; and heating the laminate at a temperature of no less than the melting point of the lithium compound and lower than reaction temperature of the cathode mixture with the oxide solid electrolyte, and sintering the cathode mixture over a surface of the layer of the oxide solid electrolyte, as one means for solving the above problem.

"A layer of an oxide solid electrolyte" is a layer having lithium ion conductivity owing to the oxide solid electrolyte.

"An oxide solid-state battery" is a battery including a cathode, an anode, and the layer of the oxide solid electrolyte that is arranged between the cathode and the anode.

The present application discloses a method for producing an oxide solid-state battery, comprising: producing a cathode active material according to the method for producing a cathode active material of this disclosure; mixing the cathode active material with a lithium compound whose melting point is lower than that of the cathode active material, to obtain a cathode mixture; layering a layer that consists of the cathode mixture, and a layer of an oxide solid electrolyte, to obtain a laminate; and heating the laminate at a temperature of no less than the melting point of the lithium compound and lower than reaction temperature of the cathode mixture with the oxide solid electrolyte, and sintering the cathode mixture over a surface of the layer of the oxide solid electrolyte, as one means for solving the above problem.

In the method for producing an oxide solid-state battery of this disclosure, preferably, the oxide solid electrolyte includes garnet type lithium lanthanum zirconate, and a temperature at which the laminate is heated is no less than the melting point of the lithium compound and lower than 600° C.

In the method for producing an oxide solid-state battery of this disclosure, the lithium compound is preferably at least one selected from the group consisting of lithium nitrate, lithium formate, lithium acetate, and lithium hydroxide.

In the method for producing an oxide solid-state battery of this disclosure, in said sintering the cathode mixture over a surface of the layer of the oxide solid electrolyte, the laminate is preferably heated either while or after pressurized.

Advantageous Effects

A layered rock-salt crystalline phase of the cathode active material of the present disclosure is partially deficient in lithium. Especially, a surface portion of its particle is deficient in lithium so much. Therefore, lithium is easy to be diffused via defect portions, and sintering is easy to progress especially in the surface portion of the particle. For example, when a lithium compound whose melting point is lower than the cathode active material is mixed to make a cathode mixture and this cathode mixture is heated, lithium efficiently diffuses from the lithium compound to the cathode active material, and the cathode mixture is sintered at low temperature. Whereby, even if the cathode mixture and a particle of an oxide solid electrolyte are sintered at the same time, chemical reaction of the cathode mixture with the oxide solid electrolyte can be suppressed, and formation of a high resistance layer over the interface between the cathode and a layer of the oxide solid electrolyte can be suppressed.

The cathode active material of the present disclosure has two phases different in crystal lattice as a layered rock-salt crystalline phase. Separate peaks derived from the layered rock-salt crystalline phase are confirmed in X-ray diffraction. When the amount of deficient lithium is too large in a layered rock-salt crystalline phase, only one peak derived from the layered rock-salt crystalline phase is confirmed in X-ray diffraction. According to the findings of the inventors of the present disclosure, when the amount of deficient lithium is too large in a layered rock-salt crystalline phase, cathode active material decomposes when sintered, which makes it impossible to perform as expected as active material. In this point, the layered rock-salt crystalline phase of the cathode active material of this disclosure can be said to be deficient in lithium by a proper amount, which can suppress decomposition of the cathode active material during sintering as lowering sintering temperature.

BRIEF DESCRIPTION OF DRAWINGS

FIG. 16A shows those of a surface portion of its particle, and FIG. 16B shows those inside the particle;

DETAILED DESCRIPTION OF EMBODIMENTS

1. Cathode Active Material

Figure 1:
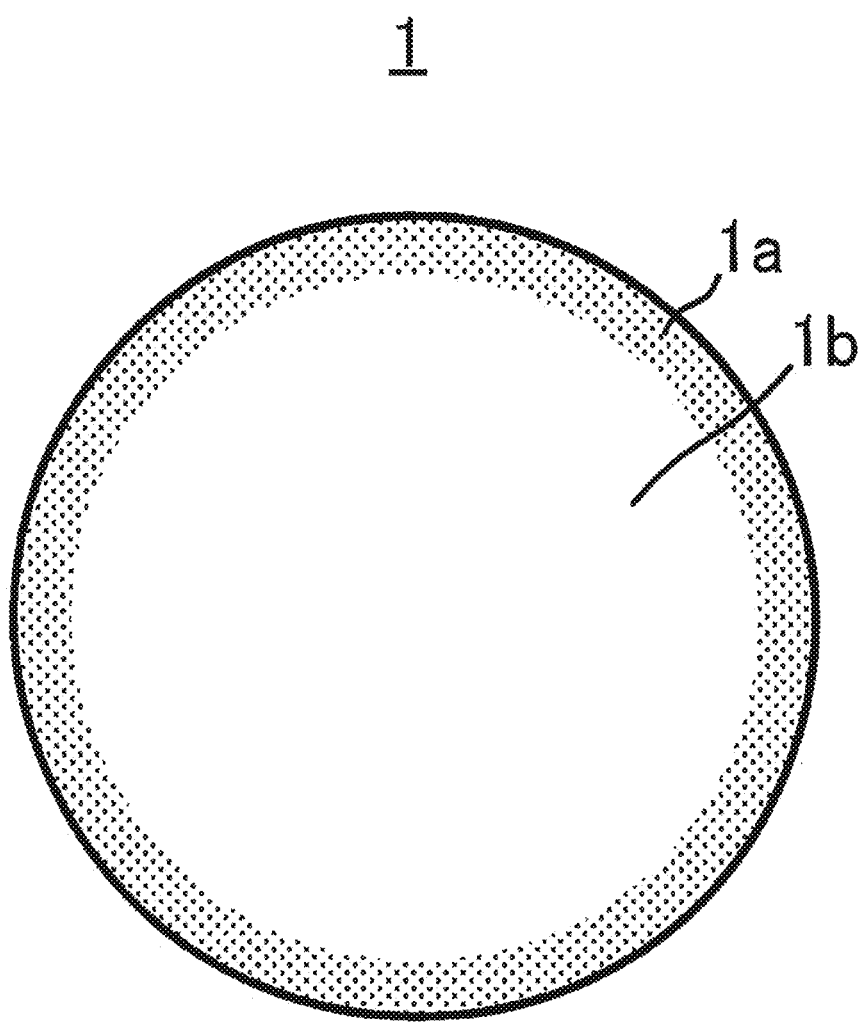
FIG. 1 is an explanatory schematic view of structure of cathode active material.

FIG. 1 schematically shows the structure of a cross section of a cathode active material 1 of the present disclosure. In FIG. 1, the shape of a particle of the cathode active material 1 is spherical for convenience for explanation. However, the shape of the cathode active material is not limited to this. As shown in FIG. 1, the cathode active material 1 of this disclosure is cathode active material that includes (a) particle(s) of a lithium containing composite oxide having a layered rock-salt crystalline phase. The layered rock-salt crystalline phase is partially deficient in lithium. The percentage of deficient lithium in the layered rock-salt crystalline phase in a surface portion 1a of the particle is higher than that in an inside 1b thereof. The particle includes two phases that are different in lattice constant as the layered rock-salt crystalline phase.

The lithium containing composite oxide having a layered rock-salt crystalline phase may function as cathode active material of an oxide solid-state battery. Specific examples of such a composite oxide include layered rock-salt composite oxides composed of lithium and at least one transition metal selected from manganese, cobalt, nickel, aluminum, etc., such as lithium cobaltate, lithium nickelate, and lithium nickel cobalt manganese oxide. The lithium containing composite oxide having a layered rock-salt crystalline phase may also include a crystalline phase different from the layered rock-salt crystalline phase as long as the effect of low temperature sintering is not ruined. Examples of such a crystalline phase include a spinel crystalline phase. A lithium containing composite oxide of a single phase which only includes the layered rock-salt crystalline phase as a crystalline phase is preferable in view of further improving properties of the battery.

The particle size (primary particle size) of the cathode active material 1 of the present disclosure is not specifically restricted. The primary particle size thereof is usually 0.1 μm to 0.1 mm although depending on the shape of a cathode to be produced by sintering.

The layered rock-salt crystalline phase of the cathode active material 1 of this disclosure is partially deficient in lithium. Therefore, the cathode active material 1 is in a state where the diffusibility of lithium is high, and sintering is easy to be promoted.

On the other hand, according to the findings of the inventors of the present application, if the amount of deficient lithium in a layered rock-salt crystalline phase is too large, a layered rock-salt crystalline structure is easily destroyed by heating, which leads to different phases. For example, if the amount of deficient lithium is too large in lithium cobaltate ($LiCoO_2$) having a layered rock-salt crystalline phase, lithium cobaltate undergoes thermal decomposition due to heating, to form cobalt oxide ($Co_3O_4$) at 250° C. or higher. Such a thermolysis product causes deterioration of properties of active material. Thus, in view of suppressing thermal decomposition, it is necessary that the amount of deficient lithium a layered rock-salt crystalline phase be as small as possible.

In this point, in the cathode active material 1 of this disclosure, the percentage of deficient lithium in the layered rock-salt c a phase in the surface portion 1a of the particle is higher than that in the inside 1b thereof. That is, while the diffusibility of lithium is high and sintering is easy to be progressed in the surface portion 1a of the particle, which contributes to sintering, lithium sufficiently exists and thermal decompositions hard to occur in the inside 1b of the particle.

The cathode material 1 of this disclosure includes two phases that are different in lattice constant as the layered rock-salt crystalline phase. When the cathode active material 1 is subjected to X-ray diffraction measurement, two separate peaks derived from the layered rock-salt crystalline phase are confirmed (both peaks are the local maximums, and are convex upward). As described above, the cathode active material 1 of this disclosure is different in percentage of deficient lithium in the layered rock-salt crystalline phase between the surface portion 1a and the inside 1b of the particle. Whereby a c-axis lattice constant of the layered rock-salt crystalline phase in the surface portion 1a of the particle is larger than that in the inside 1b thereof as a result of the comparison thereof. For example, the maximum value of the difference between a c-axis lattice constant of the layered rock-salt crystalline phase in the inside 1b of the particle, and that in the surface portion 1a thereof is no more than 0.05 nm, preferably no more than 0.03 nm, and more preferably no more than 0.01 nm. It is believed that as a result, the peak derived from the layered rock-salt crystalline phase existing in the surface portion 1a of the particle, and the peak derived from the layered rock-salt crystalline phase existing in the inside 1b of the particle are separately confirmed when X-ray diffraction measurement is carried out. This means that while the percentage of deficient lithium in the surface portion 1a of the particle is high, lithium sufficiently exists in the inside 1b of the particle. That is, as described above, while the diffusibility of lithium high and sintering is easy to be progressed in the surface portion 1a of the particle, which contributes to sintering, lithium sufficiently exists and thermal decomposition is hard to occur in the inside 1b of the particle.

In the cathode active material 1 of this disclosure, the amount of deficient lithium in the layered rock-salt crystalline phase is not specifically limited. As described above, the amount of deficient lithium has only to be just a proper amount so that the percentage of deficient lithium in the surface portion 1a of the particle is higher than that of the inside 1b thereof, and so that the particle includes two phases that are different in lattice constant, as the layered rock-salt crystalline phase.

As described above, the cathode active material of this disclosure can suppress thermal decomposition while lowering sintering temperature.

2. Cathode Mixture

Figure 2:
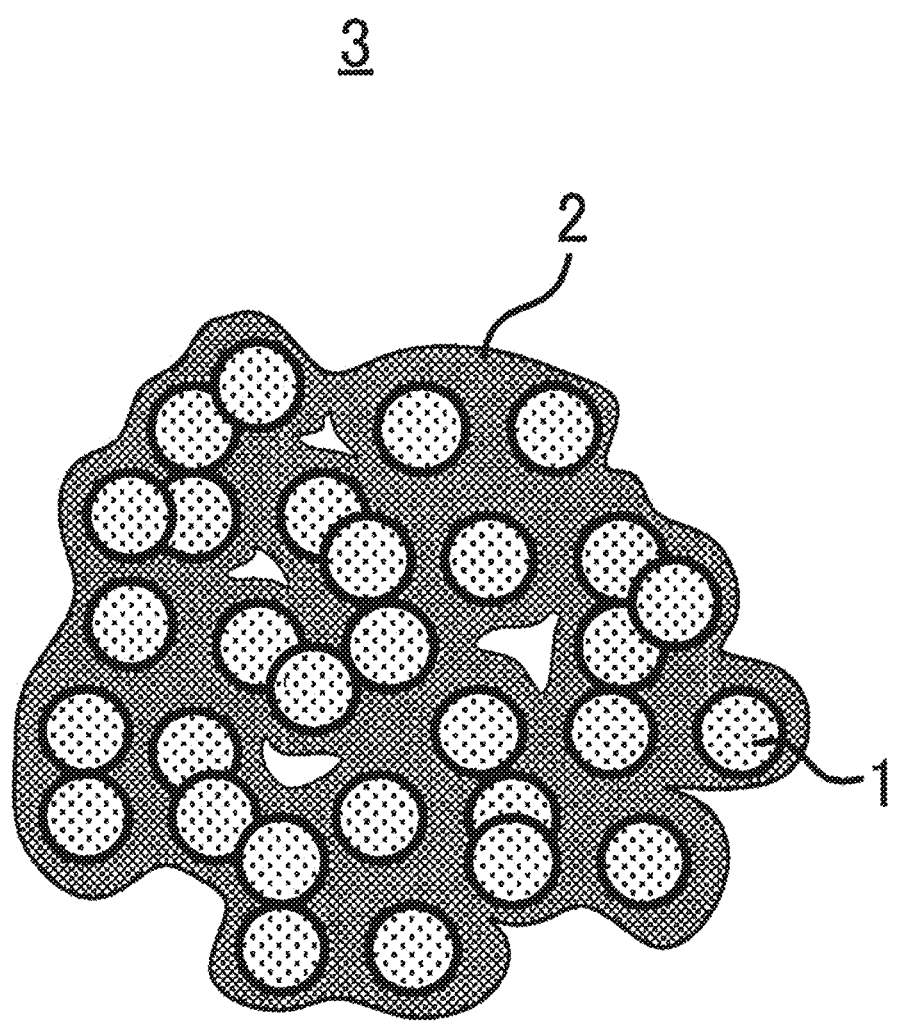
FIG. 2 an explanatory schematic view of a form of a cathode mixture.

FIG. 2 schematically shows the form of a cathode mixture 3 of this disclosure. As shown in FIG. 2, the cathode mixture 3 of this disclosure includes the cathode active material 1, and a lithium compound 2 whose melting point is lower than the cathode active material 1.

The lithium compound 2 has only to have a melting point lower than the cathode active material 1; is a lithium compound whose melting point is preferably lower than 600° C., more preferably no more than 400° C., further preferably no more than 300° C., and especially preferably no more than 250° C.; and is, for example, preferably at least one lithium compound selected from the group consisting of lithium nitrate, lithium formate, lithium acetate, and lithium hydroxide.

At least two lithium compounds are mixed, to lower the melting point of the lithium compound 2. For example, the melting point of a mixture of lithium formate and lithium acetate is lower than that of lithium formate only, and that of lithium acetate only. Thus, in view of further lowering the sintering temperature of the cathode mixture 3, the lithium compound 2 is preferably a mixture of at least two lithium compounds. In this case, the nixing ratio of different lithium compounds in the mixture is not specifically limited, and has only to be a mixing ratio that makes the melting point as low as possible. For example, when a mixture of lithium formate and lithium acetate is cased as the lithium compound 2 the molar ratio of lithium formate and lithium acetate in the mixture (lithium formate/lithium acetate) is preferably ⅓ to 3. In such a case, the inciting point of the lithium compound 2 lowers, for example, to 250° C. or lower.

In the cathode mixture 3 of this disclosure, the mixing ratio of the cathode active material 1 and the lithium compound 2 is not specifically restricted. The amount of the lithium compound 2 is preferably increased as much as possible in view of lowering sintering temperature. On the other hand, the amount of the cathode active material 1 is preferably increased as much as possible in view of securing high lithium ion conductivity and high electronic conductivity. The mixing ratio of the cathode active material 1 and the lithium compound 2 may be determined according to the properties of a cathode to be aimed. For a guideline, the lithium compound 2 is 1 part by mass to 100 parts by mass, to 100 parts by mass of the cathode active material 1.

In the cathode mixture 3, the cathode active material 1 is in the form of a particle as described above. In contrast, the form of the lithium compound 2 is not specifically limited. The lithium compound 2 may be in the form of a particle, or may exist in the form of a layer so as to cover the surface of the cathode active material 1 as shown in FIG. 2.

The cathode mixture 3 of this disclosure has only to include at least the cathode active material 1 and the lithium compound 2. Conductive material may be optionally included in addition to them as far as the sintering temperature and properties of the cathode are not badly influenced. Examples of the conductive material include carbon material and metallic material. It is believed that the conductive material improve the electronic conductivity of the cathode. It is noted that the cathode mixture 3 of this disclosure can be a compact by sintering, and has high electronic conductivity without including the conductive material. That is, in the cathode mixture 3 of this disclosure, the proportion of the cathode active material 1 can be relatively high, which can increase the capacity of the cathode.

According to the new findings of the inventors of the present application, when the cathode mixture 3, and a layer of an oxide solid electrolyte 4 described later are sintered, there is a case where an acid is formed as a side product. In this case, a hydroxide is preferably contained in the cathode mixture 3 as an alkali component in order to neutralize the formed acid. A hydroxide is a compound having hydroxide ions as anions. From the viewpoint that the acid can be neutralized more certainly, and that properties of the battery can be further improved, an alkali metal hydroxide is preferable, and lithium hydroxide is more preferable as the hydroxide. The shape of the hydroxide is not specifically limited, but is especially preferably in the form of a particle. In this case, the particle size of the hydroxide is not specifically limited, and is usually 0.1 μm to 0.1 mm. The content of the hydroxide in the cathode mixture 3 is not specifically limited. In view of surely neutralizing the formed acid, the amount of the hydroxide is preferably as large as possible. In contrast, in view of securing high lithium ion conductivity and high electron conductivity, the amount of the cathode active material 1 is preferably as large as possible. The content of the hydroxide in the cathode mixture 3 may be determined according to the properties of the cathode to be aimed. For example, the hydroxide can be 1 part by mass to 100 parts by mass, to 100 parts by mass of the cathode active material 1.

Further, an oxide solid electrolyte described later can be contained in the cathode mixture 3. It is believed that this makes it possible to more firmly join a cathode 10 to a layer of the oxide solid electrolyte 20 which will be described later. The content of the oxide solid electrolyte in the cathode mixture 3 is not specifically limited.

3. Method for Producing Cathode Active Material

Figure 3:
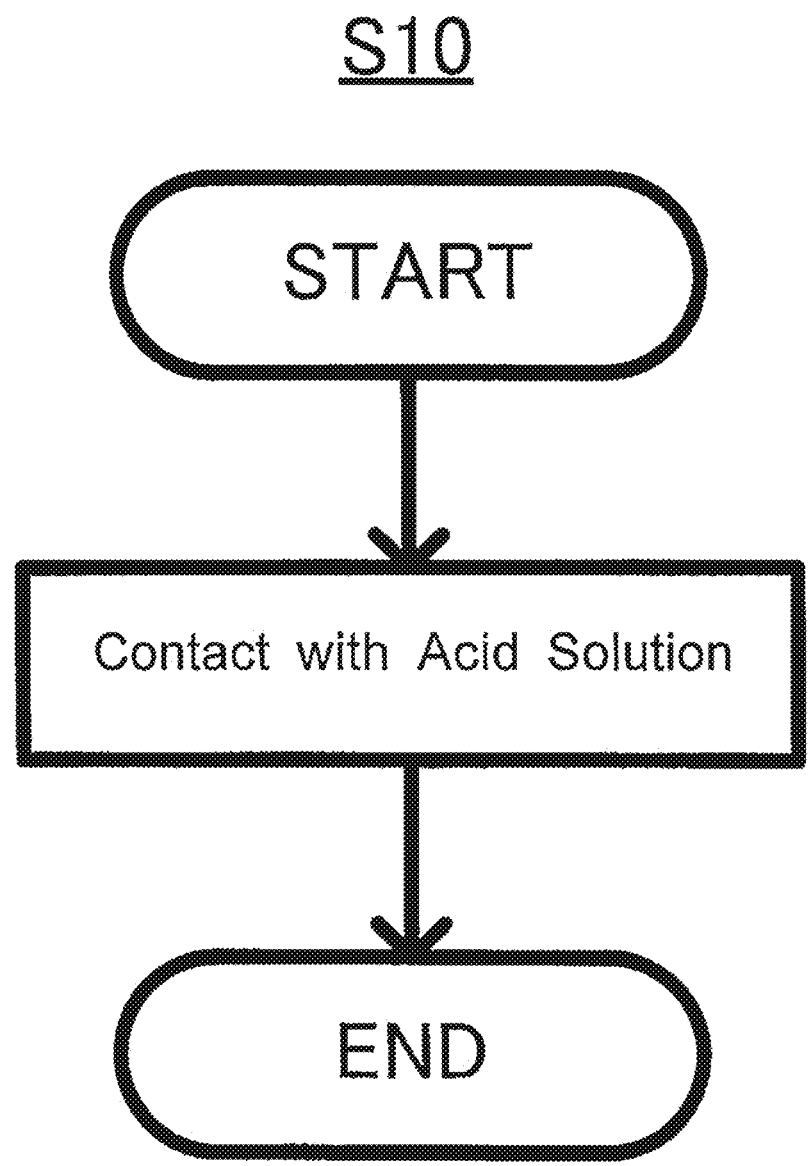
FIG. 3 is an explanatory flowchart of a method for producing cathode active material S10.
Figure 4:
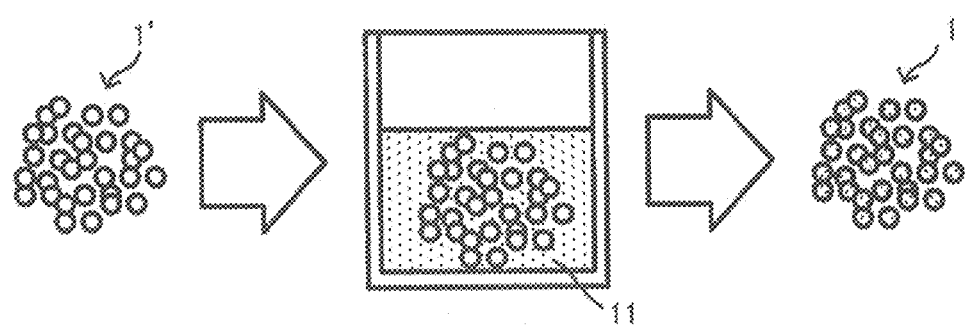
FIG. 4 is an explanatory view of a flow of the method for producing cathode active material S10.

FIGS. 3 and 4 show the flow of a method for producing a cathode active material S10. In the producing method S10, particles 1' of the lithium containing composite oxide having a layered rock-salt crystalline phase are contacted with an acid solution 11, and lithium is extracted from the surfaces of the particles 1' to the acid solution 11 to obtain the cathode active material 1 including two phases that are different in lattice constant as the layered rock-salt crystalline phase.

The manner of contacting the particles 1' to the acid solution 11 is not specifically limited, and has only to be such that the surfaces of the particles 1' are modified by an acid. For example, as shown in FIG. 4, the particles 1' are immersed in the acid solution 11, which makes it possible to extract lithium from the surfaces of the particles 1'. An acid contained in the acid solution is not specifically limited, may be an inorganic acid such as hydrochloric acid, nitric acid, and sulfuric acid, and may be an organic acid such as acetic acid, formic acid, and oxalic acid. Solvent that is a constituent of the acid solution is not specifically limited as well. Every solvent such as water and an organic solvent can be employed. The time for contacting the particles 1' with the acid solution 11 is not specifically restricted as well. Any length of time may be taken therefor as long as the cathode active material 1 after contacted with the acid solution keeps its particulate shape, and as long as two phases that are different in lattice constant are included as the layered rock-salt crystalline phase as described above. According to the findings of the inventors of the present application, even if the particles 1' of the lithium containing composite oxide are acid-treated, the layered rock-salt structure as a crystal structure is kept.

In the producing method S10, the ratio (A1/B1) of the number of hydrogen ions included in the acid solution 11 (A1) to that of lithium atoms included in the particles 1' before contacted with the acid solution 11 (B1) is preferably no more than ⅓. The inventors of the present application found that too large a number of hydrogen ions included in the acid solution 11 makes it easy to excessively extract lithium from the particles 1' when the acid solution 11 is contacted with the particles 1'. Excessive extraction of lithium might make it impossible to obtain the cathode active material 1 including phases that are different in lattice constant as the layered rock-salt crystalline phase. No more than ⅓ of A1/B1 makes it easy to avoid such a problem.

In the producing method S10, the ratio (B2/B1) of the number of lithium atoms included in the particles (cathode active material 1) after contacted with the acid solution 11 (B2) to that of lithium atoms included in the particles 1' before contacted with the acid solution (B1) is preferably no less than 0.9 and less than 1.0. No less than 0.9 of B2/B1 makes it possible to make a more proper amount of deficient lithium in the layered rock-salt crystalline phase of the cathode active material 1, and makes it easier to form two phases different in lattice constant as the layered rock-salt crystalline phase.

Contacting the particles 1' with the acid solution 11 causes extraction of lithium from the surface portions of the particles 1' prior to the inside thereof. As a result, the cathode active material 1 is such that the percentage of deficient lithium in the layered rock-salt crystalline phase in the surface portion of the particle is larger than that inside the particle.

As described above, cathode active material of this disclosure can be easily produced by contacting the particles 1' with the acid solution 11, and by properly adjusting the conditions for acid treatment (the number of hydrogen ions included in the acid solution etc.).

It is predicted that the cathode active material 1 of this disclosure can be produced by a method other than the producing method S10 as well. For example, it is predicted that the cathode active material 1 can be produced by applying a predetermined voltage to the particles 1', and electrically extracting lithium from the surfaces of the particles 1'. From the viewpoints that lithium in the surface portions of the particles 1' can be easily extracted, that the amount of deficient lithium can be easily controlled, that the manufacturing costs are reduced, etc., the cathode active material 1 is preferably produced by contacting the particles 1' with the acid solution 11 as the producing method S10.

4. Method for Producing Cathode

Figure 5:
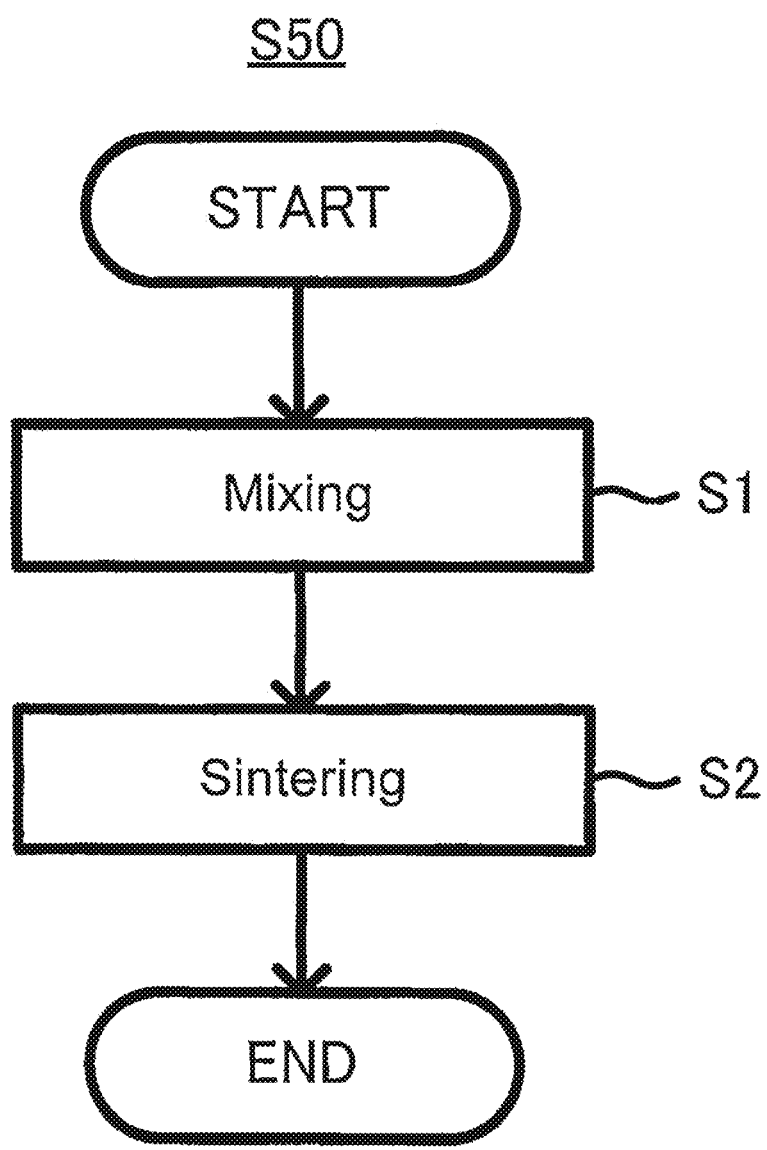
FIG. 5 is an explanatory flowchart of a method for producing a cathode S50.
Figure 6A:
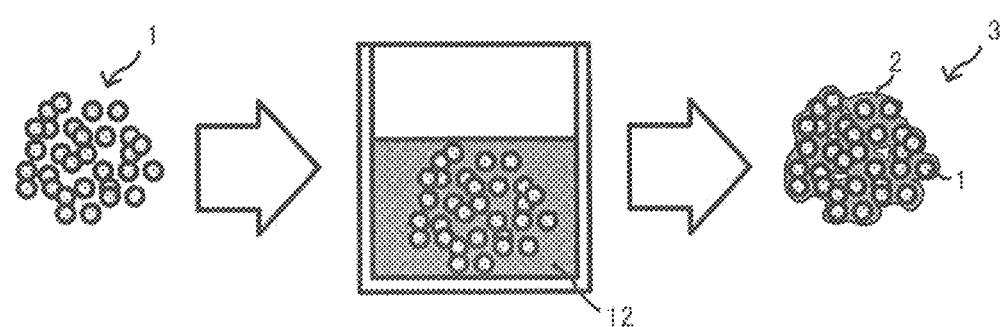
FIGS. 6A and 6B are explanatory views of a flow of the method for producing a cathode S50.
Figure 6B:
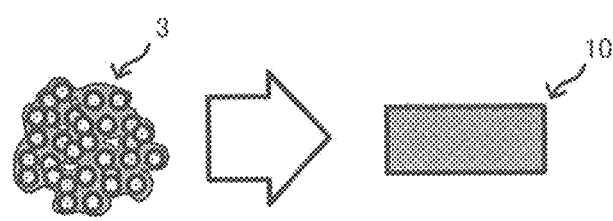

FIGS. 5 to 6B show the flow of a method for producing a cathode S50. The producing method S50 includes a step S1 of mixing the cathode active material 1 of this disclosure with the lithium compound 2 whose melting point is lower than that of the cathode active material 1, to obtain the cathode mixture 3, and a the step S2 of heating the cathode mixture 3 to a temperature of the melting point of the lithium compound 2 or higher, to sinter the cathode mixture 3.

Especially in the producing method S50, the cathode active material 1 produced according to the producing method S10 is preferably used. That is, the producing method S50 preferably includes a step of producing the cathode active material 1 according to the producing method S10, the step S1 of mixing the cathode active material 1 with the lithium compound 2 whose melting point is lower than that of the cathode active material 1, to obtain the cathode mixture 3, and the step S2 of heating the cathode mixture 3 to a temperature of the melting point of the lithium compound 2 or higher, to sinter the cathode mixture 3.

4.1. Step S1

In the step S1, mixing of the cathode active material 1 with the lithium compound 2 may be either dry mixing of the solids with each other, or wet mixing using solvent or the like. In either case, the cathode active material 1 and the lithium compound 2 can be mixed by a known mixing method. Specifically, wet mixing using solvent or the like is preferable because the lithium compound 2 can be more uniformly arranged around the cathode active material 1. For example, as shown in FIG. 6A, the lithium compound is dissolved in water, to make an aqueous solution 12, the cathode active material 1 is immersed in the aqueous solution 12, and then moisture is evaporated by heating, and thereby the cathode mixture 3 of the cathode active material 1, and the lithium compound 2 arranged around the cathode active material 1 is obtained.

The mixing ratio of the cathode active material 1 and the lithium compound 2 in the step S1 is as described above. As described above, the cathode mixture 3 may optionally contain conductive material and so on in addition to the cathode active material 1 and the lithium compound 2. In this case, the conductive material and so on may be mixed at the same time when e cathode active material 1 and the lithium compound 2 are mixed.

4.2. Step S2

As described above, the layered rock-salt crystalline phase excessively deficient lithium might decompose due to heating. For example, as described above, layered rock-salt lithium cobaltate excessively deficient in lithium decomposes at 250° C. or higher, to form cobalt oxide with release of oxygen. Cobalt oxide is inactive in electrochemical reaction, and does not contribute to charge-discharge reaction of a battery. Thus, it is better to reduce the amount of cobalt oxide in a cathode as much as possible. The heating temperature in the step S2 is preferably as love as possible in such a view. It is effective to use a lithium compound having a melting point as low as possible as the lithium compound 2 in order to sinter the cathode mixture 3 at lower temperature in the step S2. For example, as described above, a mixture of at least two lithium compounds is used as the lithium compound 2, which can lower the melting point of the lithium compound 2. Specifically, when lithium formate and lithium acetate are mixed, the melting point becomes lower than 250° C., which is preferable.

In the producing method S10, as described above, since the cathode active material 1 that is difficult to undergo thermal decomposition is employed, formation of cobalt oxide can be suppressed even if the heating temperature in the step S2 is no less than 250° C., which makes it possible to produce the cathode 10 of a large capacity. That is, the heating temperature in the step S2 may be no less than 250° C. In contrast, the heating temperature is preferably as low as possible in view of suppressing chemical reaction upon joining with other battery materials, in view of energy efficiency etc. Specifically, heating here is carried out preferably at a temperature lower than 600° C., more preferably at a temperature of no more than 400° C., and further preferably at a temperature of no more than 300° C.

The step S2 can be carried out using a known heating means. A heating atmosphere in the step S2 has only to be an atmosphere under which the cathode mixture 3 can be sintered without any unnecessary reaction therefor. Examples of an atmosphere under which this sintering can be carried out include various atmospheres such as oxygen-containing atmospheres (air atmosphere, the atmosphere, etc.), and inert gas atmospheres.

In the step S2, an apparent volume of the cathode mixture 3 gradually becomes small as the mixture 3 is sintered. Here, there is a case where air bubbles and the like inside do not completely come out during sintering, and voids remain inside the cathode 10. Preferably, the cathode mixture 3 is heated while pressurized, or the cathode mixture 3 is heated after pressurized in the step S2 in order to suppress generation of these voids and to obtain the cathode 10 of much higher density. Specifically, the cathode mixture 3 is preferably heated while pressurized. Whereby, the cathode 10, which has a predetermined shape and is compact, can be obtained (FIG. 6B). In S2, when the cathode mixture 3 is pressurized, magnitude of the pressure is not specifically restricted, and for example, is preferably 0.1 MPa to 1000 MPa. A means for pressurizing the cathode mixture 3 is not specifically restricted. For example, the cathode mixture 3 can be heated while pressurized by using a die or the like made of material that does not react with the cathode mixture 3 substantially, and that can bear heating in the step S2.

As described above, in the producing method S50, while thermal decomposition of the cathode active material 1 is suppressed the cathode mixture 3 is sintered at low temperature, and the cathode 10 can be obtained.

5. Method for Producing Oxide Solid-State Battery

Figure 7:
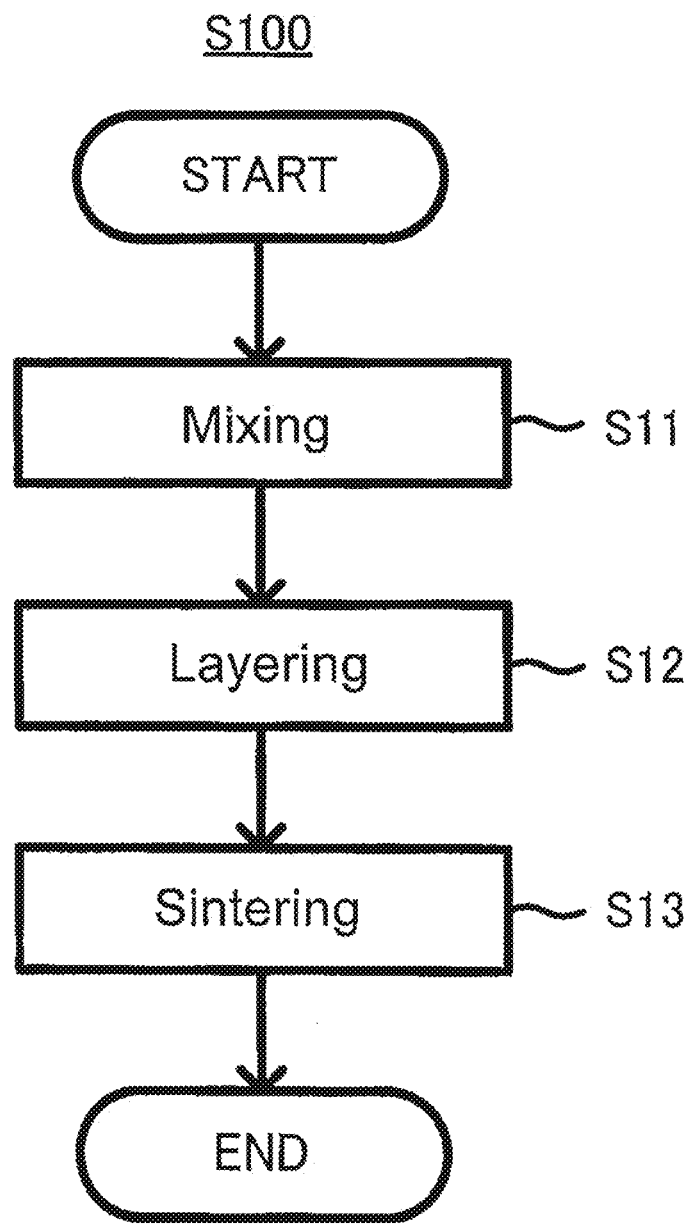
FIG. 7 is an explanatory flowchart of a method for producing an oxide solid-state battery S100.
Figure 8A:
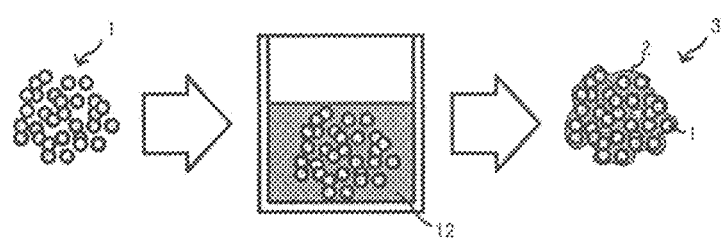
FIGS. 8A to 8C are explanatory views of a flow of the method for producing an oxide solid-state battery S100.
Figure 8B:
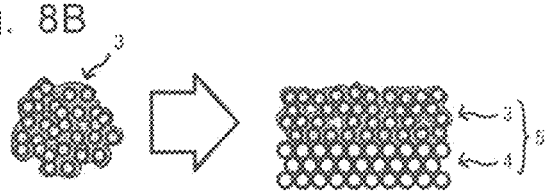
Figure 8C:
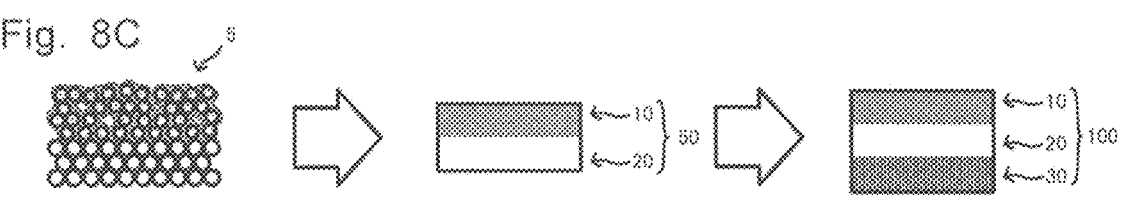

FIGS. 7 to 8C show a method for producing an oxide solid-state battery S100. The producing method S100 includes a step S11 of mixing the cathode active material 1 with the lithium compound 2 whose melting point is lower than that of the cathode active material 1, to obtain the cathode mixture 3, a step S12 of layering a layer consisting of the cathode mixture 3, and the layer of the oxide solid electrolyte 4, to obtain a laminate 5, and a step S13 of heating the laminate 5 at a temperature of no less than the melting point of the lithium compound 2 and lower than the reaction temperature of the cathode mixture 3 with the oxide solid electrolyte, and sintering the cathode mixture 3 over a surface of the layer of the oxide solid electrolyte 4.

Specifically, in the producing method S100, the cathode active material 1 produced according to the producing method S10 is preferably used. That is, the producing method S100 preferably includes a step of producing the cathode active material 1 according to the producing method S10, the step S11 of mixing the cathode active material 1 with the lithium compound 2 whose melting point is lower than that of the cathode active material 1, to obtain the cathode mixture 3, the step S12 of layering a layer consisting of the cathode mixture 3, and the layer of the oxide solid electrolyte 4, to obtain the laminate 5, and the step S13 of heating e laminate 5 at a temperature of no less than the melting point of the lithium compound 2 and lower than the reaction temperature of the cathode mixture 3 with the oxide solid electrolyte, and sintering the cathode mixture 3 over a surface of the layer of the oxide solid electrolyte 4.

5.1. Step S11

The step S11 is the same step as the step S1 (FIGS. 6A and 8A). Description thereof is omitted here.

5.2. Step S12

In the step S12 a layer consisting of the cathode mixture 3, and the layer of the oxide solid electrolyte 4 are layered to obtain the laminate 5. For example, the layer of the oxide solid electrolyte 4 in the step S12 may be an accumulating layer of particles of the oxide solid electrolyte, or a sintered layer of the oxide solid electrolyte. Preferably, as shown in FIG. 8B, the layer 4 is an accumulating layer of oxide solid electrolyte particles. The size of an oxide solid electrolyte particle in this case is not specifically restricted. The size is usually 0.1 μm to 0.1 mm. When the layer 4 is an accumulating layer of oxide solid electrolyte particles, sintering the oxide solid electrolyte particles, and sintering the cathode mixture 3 with the oxide solid electrolyte particles simultaneously progress at the same time when the cathode mixture 3 is sintered in the step S13 described later. Whereby, the cathode 10 can be more firmly joined with the layer of the oxide solid electrolyte 20 after sintering.

When the layer of the oxide solid electrolyte 4 is an accumulating layer of oxide solid electrolyte articles, the layer of the oxide solid electrolyte 4 preferably includes the lithium compound 2. That is, the layer of the oxide solid electrolyte 4 is preferably formed of a solid electrolyte mixture including the oxide solid electrolyte and the lithium compound 2. Whereby, the layer of the oxide solid electrolyte 4 can be sintered at lower temperature. The content of the lithium compound 2 in the layer of the oxide solid electrolyte 4 is not specifically limited.

Any solid oxide that has lithium ion conductivity and that can be used as an electrolyte for an oxide solid-state battery can be employed as the oxide solid electrolyte that is a constituent of the layer of the oxide solid electrolyte 4. Examples thereof include garnet type oxides such as lithium lanthanum zirconate, perovskite type oxides such as lithium lanthanum titanate, and NASICON type oxides such as $Li_{1+y}Al_yTi_{2-y}(PO_4)_3$ ($0 \leq y \leq 1$). Among them, garnet type lithium lanthanum zirconate is preferable in view of high lithium ion conductivity, and of obtaining a further remarkable effect according to the method of the present disclosure. When the layer of the oxide solid electrolyte 4 is formed of a solid electrolyte mixture including the oxide solid electrolyte and the lithium compound 2, preferably, lithium the oxide solid electrolyte is partially extracted in advance in order to improve the diffusibility of lithium in the oxide solid electrolyte. For example, garnet type lithium lanthanum zirconate is contacted with water, which makes it possible to partially extract lithium from this garnet type lithium lanthanum zirconate.

In the step S12 for example, the laminate 5 can be made by: arranging the oxide solid electrolyte particles in a mold in the form of a layer, to obtain the layer of the oxide solid electrolyte 4; and placing the cathode mixture 3 over the surface of the layer 4 in the form of a layer. In the laminate 5, the thickness of the layer consisting of the cathode mixture 3, and the thickness of the layer of the oxide solid electrolyte 4 are not specifically restricted. The thicknesses may be properly determined according to the properties of the battery to be aimed. The laminate 5 may be press-formed as described later.

5.3. Step S13

In the step S13, the laminate 5 is heated at the melting point of the lithium compound 2 or higher, and lower than the reaction temperature of the cathode mixture 3 with the oxide solid electrolyte, to sinter the cathode mixture 3 over the surface of the layer of the oxide solid electrolyte 4. Whereby, a joining body 50 of the cathode 10 and the layer of the oxide solid electrolyte 20 is obtained. An anode 30 is provided for this joining body 50 (this includes a case where anode material is joined at the same time when the layer consisting of the cathode mixture 3, and the layer of the oxide solid electrolyte 4 are sintered in the step S13, as described later), and thereby an oxide solid-state battery 100 can be produced.

The step S13 can be carried out using a known heating means. The heating temperature in the step S13 has only to be the melting point of the lithium compound 2 or higher, and lower than the reaction temperature of the cathode mixture 3 with the oxide solid electrolyte. The heating temperature is preferably as low as possible in view of energy efficiency, and of suppressing decomposition of the acid-treated particles 1. Specifically, heating here is carried out preferably at a temperature lower than 600° C., more preferably at a temperature of no more than 400° C., further preferably at a temperature of no more than 300° C., and especially preferably at a temperature of no more than 250° C.

According to the new findings of the inventors of the present application, when an oxide solid electrolyte contains garnet type lithium lanthanum zirconate, there might be a case where a layered rock-salt lithium containing composite oxide reacts with the oxide solid electrolyte at 600° C. or higher, to form a high resistance layer. Therefore, in this case, it is preferable that the temperature at which the laminate 5 is heated be no less than the melting point of the lithium compound 2, and lower than 600° C. This heating is carried out more preferably at a temperature of no more than 400° C., further preferably at a temperature of no more than 300° C., and especially preferably at a temperature of no more than 250° C.

As described above, an apparent volume of the cathode mixture gradually becomes small as the mixture 3 is sintered. Here, there is a case where bubbles and the like inside do not completely come out during sintering, and voids remain inside the cathode 10. Therefor, preferably, the laminate 5 is heated while pressurized, or the laminate 5 is heated after pressurized in the step S13. Specifically, the laminate 5 is preferably heated while pressurized in the step S13. Whereby, the joining body 50 that has a predetermined shape and is compact can be obtained (FIG. 8C). In S13, when the laminate 5 is pressurized, magnitude of the pressure is not specifically restricted, and for example, is preferably 0.1 MPa to 1000 MPa. A means for pressurizing the laminate 5 is not specifically restricted. For example, the laminate 5 can be heated while pressurized by using a die or the like made of material that does not react with the cathode mixture 3 or the layer of the oxide solid electrolyte 4 substantially, and that can bear heating in S13.

5.4. Anode

The anode 30 provided for the oxide solid-state battery 100 has only to contain anode active material. For example, silicon or lithium can be employed as the anode active material. Silicon is preferable because the battery can have a higher capacity.

In the producing method S100, the anode 30 has only to be joined with a surface of the layer of the oxide solid electrolyte 20 of the joining body 50 (surface on the opposite side of the cathode 10). A method of joining the anode 30 is not specifically restricted. For example, anode material is deposited on the surface of the layer of the oxide solid electrolyte 20, whereby the anode 30 can be joined with the surface of the layer of the oxide solid electrolyte 20. Or, anode material is layered over the surface of the layer of the oxide solid electrolyte 4 or 20, and heated, whereby the layer of the oxide solid electrolyte 20 can be joined with the anode 30.

Figure 9:
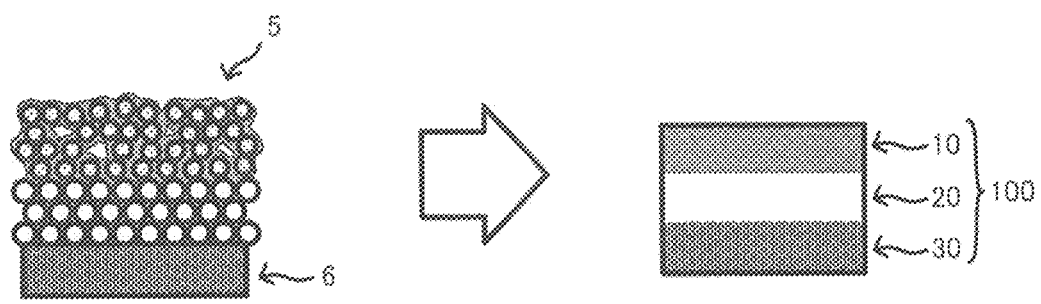
FIG. 9 is an explanatory view of an example of a method for joining an anode.

When the anode 30 is joined with the layer of the oxide solid electrolyte 20 by heating, as shown in FIG. 9, an anode material 6 is preferably joined with the layer of the oxide solid electrolyte 4 in the step S13. That is, preferably, the cathode mixture 3, the oxide solid electrolyte, and the anode material 6 are integrally calcined, and simultaneously sintered. According to the findings of the inventors of the present application, when silicon is used as anode active material, and an oxide solid electrolyte contains garnet type lithium lanthanum zirconate, there might be a case where silicone reacts with the oxide solid electrolyte at 600° C. or higher, to form a high resistance layer. Therefore, in this case, it is proposed that the heating temperature in the step S13 be lower than 600° C. The heating is carried out more preferably at a temperature of no more than 400° C., further preferably at a temperature of no more than 300° C., and especially preferably at a temperature of no more than 250° C.

2.5. Other Components

The oxide solid-state battery 100 is properly provided with current collectors, terminals, and so on. These are publicly known, and thus, description thereof is omitted here.

As described above, in the producing method S100, the cathode mixture 3 can be sintered at low temperature while thermal decomposition of the cathode active material 1 is suppressed, and the cathode 10 and the layer of the oxide solid electrolyte 20 can be joined at low temperature. In addition, even when the anode 30 is joined simultaneously with the cathode 10 and the layer of the oxide solid electrolyte 20, reaction of the layer of the oxide solid electrolyte 20 with the anode 30 can be suppressed.

EXAMPLES (1) Producing Oxide Solid-State Battery According to Example 1

The following Examples show a case where lithium cobaltate ($Li_2CoO_2$) was used as a lithium containing composite oxide having a layered rock-salt structure, lithium nitrate ($LiNO_3$) and/or lithium hydroxide (LiOH) was/were used as a lithium compound, garnet type lithium lanthanum zirconate ($Li_7La_3Zr_2O_{12}$) was used as an oxide solid electrolyte, and lithium metal was used as an anode. The technique of the present disclosure is not limited to this. It is obvious that the same effect is brought about even if any material other than them used.

(1-1) Producing Solid Electrolyte Mixture

In a mortar, 1 g of lithium lanthanum zirconate where hydrogen was partially substituted for lithium (which is partially deficient in lithium) using pure water, and 0.1 g of lithium nitrate were mixed, to obtain a solid electrolyte mixture.

(1-2) Producing Cathode Active Material

Into a beaker, 100 ml of hydrochloric acid (HCl) which was prepared to have a pH of 1 was put, and 3 g of lithium cobaltate particles was added thereto. After that, the resultant was stirred using a stirrer at 500 rpm in rotation speed at 25° C. for 16 hours. After stirring was ended, the resultant liquid was filtered through filter paper, to obtain cathode active material according to Example 1.

(1-3) Producing Cathode Mixture

In a mortar, 0.5632 g of the cathode active material, 0.0248 g of lithium hydroxide, and 0.4120 g of the solid electrolyte mixture were mixed, to obtain 1 g of a cathode mixture.

(1-4) Layering and Sintering

Into a pelleting jig made of alumina ($Al_2O_3$) of 11.28 mm in diameter (1 $cm^2$), 450 mg of the solid electrolyte mixture was put, and was molded with a die made of stainless steel (SUS304) at 100 MPa in pressure, to obtain a layer of the oxide solid electrolyte.

Over a surface of the layer of the oxide solid electrolyte in the jig, 31.0 mg of the cathode mixture was layered, was molded with a die made of stainless steel (SUS304) at 100 MPa in pressure to obtain a laminate, and was continuously heated while pressurized at 100 MPa under an argon atmosphere at 400° C. for 8 hours, to obtain a joining body of a cathode and the layer of the oxide solid electrolyte.

(1-5) Joining Anode

Lithium was deposited over a surface of the layer of the oxide solid electrolyte of the obtained joining body (surface on the opposite side of the cathode) to be joined as the anode, to obtain an oxide solid-state battery for evaluation.

(2) Producing Oxide Solid-State Battery According to Comparative Example 1

An oxide solid-state battery was obtained in the same manner as Example 1 except that the lithium cobaltate particles without acid treatment were used as they were.

(3) Producing Oxide Solid-State Battery According to Comparative Example 2

An oxide solid-state battery was obtained in the same manner as Example 1 except that 250 ml of hydrochloric acid which was prepared to have a pH of 1 was used as the acid solution when the cathode active material was produced.

(4) Producing Oxide Solid-State Battery According to Comparative Example 3

An oxide solid-state battery was obtained in the same manner as Example 1 except that 500 ml of hydrochloric acid which was prepared to have a pH of 1 was used as the acid solution when the cathode active material was produced.

(5) Charge Discharge Testing

Figure 10:
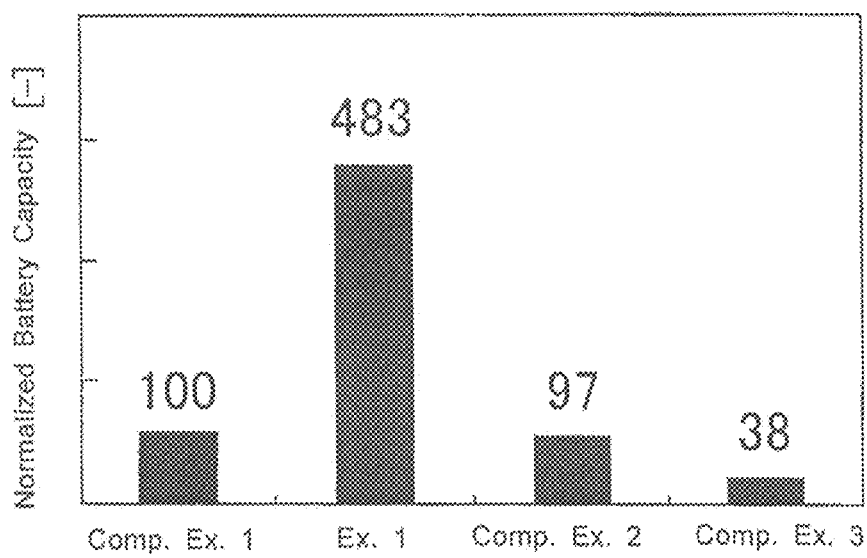
FIG. 10 shows capacities of batteries according to Example 1 and Comparative Examples 1 to 3.

The batteries according to Example 1 and Comparative Examples 1 to 3 were charged to 4.05 V at 0.01 mA under the temperature environment at 60° C., and thereafter discharged to 3.00 V at 0.01 mA, to measure their battery capacities. The results are shown in FIG. 10. In FIG. 10, the capacities were normalized using the capacity of the battery of Comparative Example 1 as 100.

As shown in FIG. 10, the capacity of the battery of Example 1 was approximately 5 to 10 times as large as those of the batteries of Comparative Examples 1 to 3. The battery of Example 1 had an excellent property.

(6) Impedance Measurement

Figure 11:
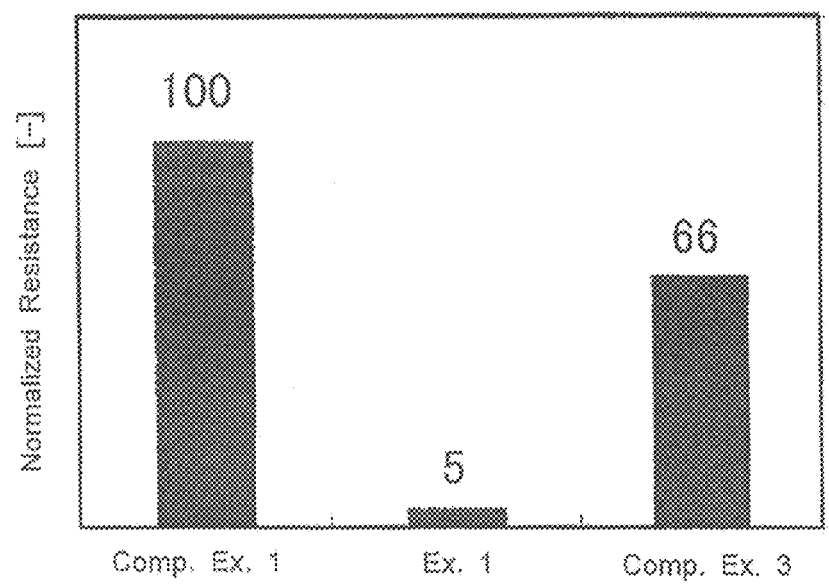
FIG. 11 shows resistances of batteries according to Example 1 and Comparative Examples 1 and 3.

Impedances of the batteries according to Example 1 and Comparative Examples 1 and 3 were measured under conditions of: frequency range: 0.1 to $10^6$ Hz; applied voltage: 25 mV; and temperature: 60° C., to measure the resistances of the batteries. The results are shown in FIG. 11. In FIG. 11, the resistances were normalized using the resistance of the battery of Comparative Example 1 as 100.

As shown in FIG. 11, the resistance of the battery of Example 1 was no more than 1/10 of those of the batteries of Comparative Examples 1 and 3. The battery of Example 1 had an excellent property.

(7) Observing Cross Section of Battery 1

Figure 12A:
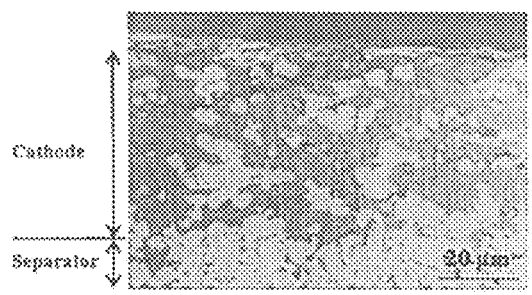
FIGS. 12A and 12B respectively show SEM images of cross sections of cathodes of the batteries according to Example 1 and Comparative Example 1.
Figure 12B:
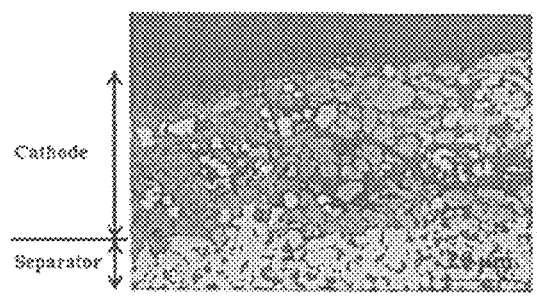

States of cross sections of the cathodes of the batteries according to Example 1 and Comparative Example 1 were observed with SEM in order to confirm the factor of deteriorated properties of the battery according to Comparative Example 1. FIG. 12A shows a SEM image of a cross section of the cathode of the battery of Example 1, and FIG. 12B shows a SEM image of a cross section of the cathode of the battery of Comparative Example 1.

As shown in FIG. 12A, no cracking was observed in the cathode of the battery of Example 1, the cathode was well sintered. In contrast, as shown in FIG. 12B, there existed large cracking in the cathode of the battery of Comparative Example 1, and the cathode was not sufficiently sintered. It is believed that whereby, the properties of the battery deteriorated.

(8) Observing Cross Section of Battery 2

A crystal phase included in the cathode of the battery according to Comparative Example 3 was observed using electron diffraction with TEM in order to confirm the factor of deteriorated properties of the battery of Comparative Example 3. The results are shown in FIG. 13.

Figure 13:
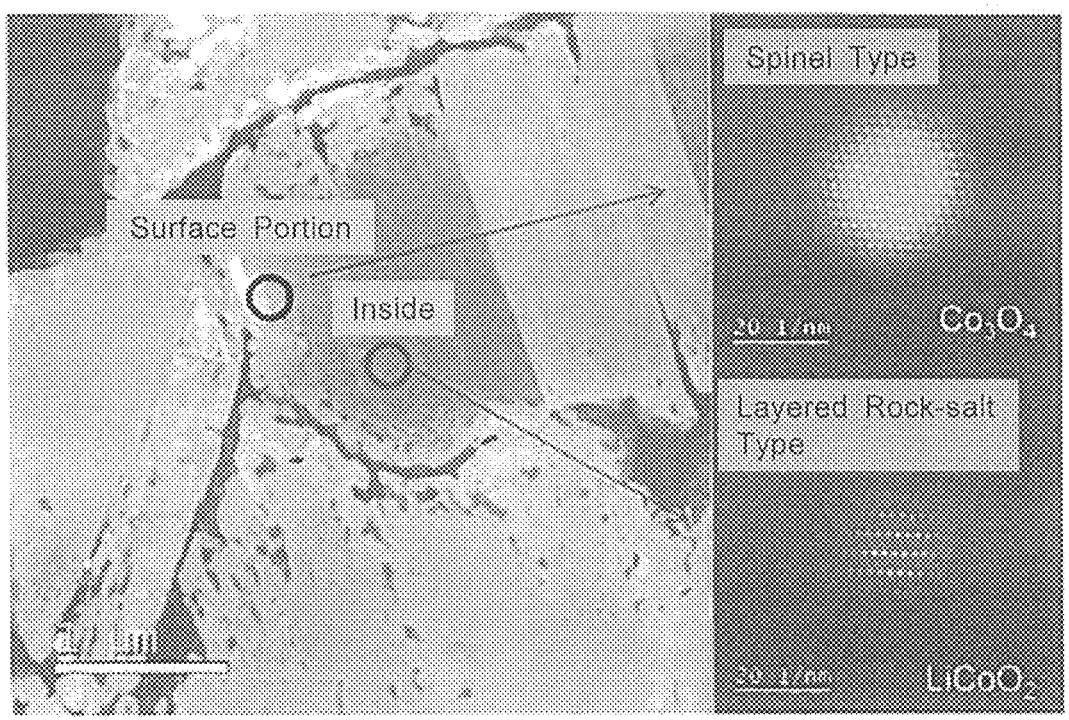
FIG. 13 shows a TEM image and electron diffraction of a cross section of a cathode of a battery according to Comparative Example 3.

As shown in FIG. 13, in the battery of Comparative Example 3, while an inside of a cathode active material particle after sintering kept a layered rock-salt crystalline structure, a surface portion of the cathode active material particle after sintering changed to have a spinet crystalline phase. $Co_3O_4$ that is electrochemically inactive formed in the surface portion of the cathode active material particle after sintering. It is believed that whereby properties of the battery deteriorated.

(9) X-Ray Diffraction Measurement on Cathode After Heat Treatment

Figure 14B:
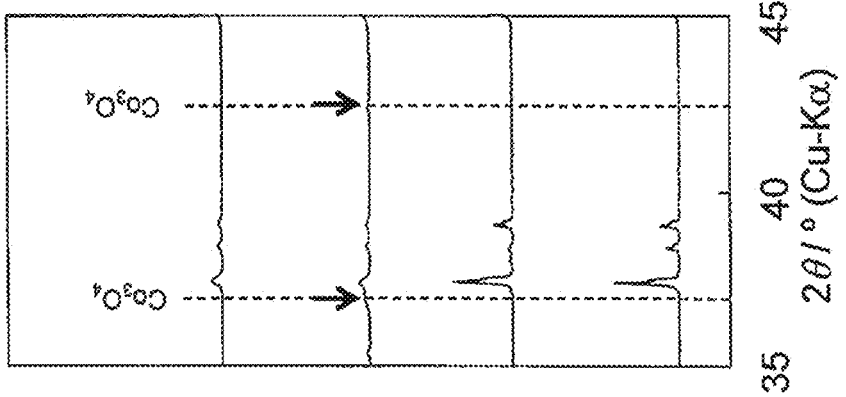
FIGS. 14A and 14B show results of X-ray diffraction measurement of the cathodes according to Example 1 and Comparative Example 3.
Figure 14A:
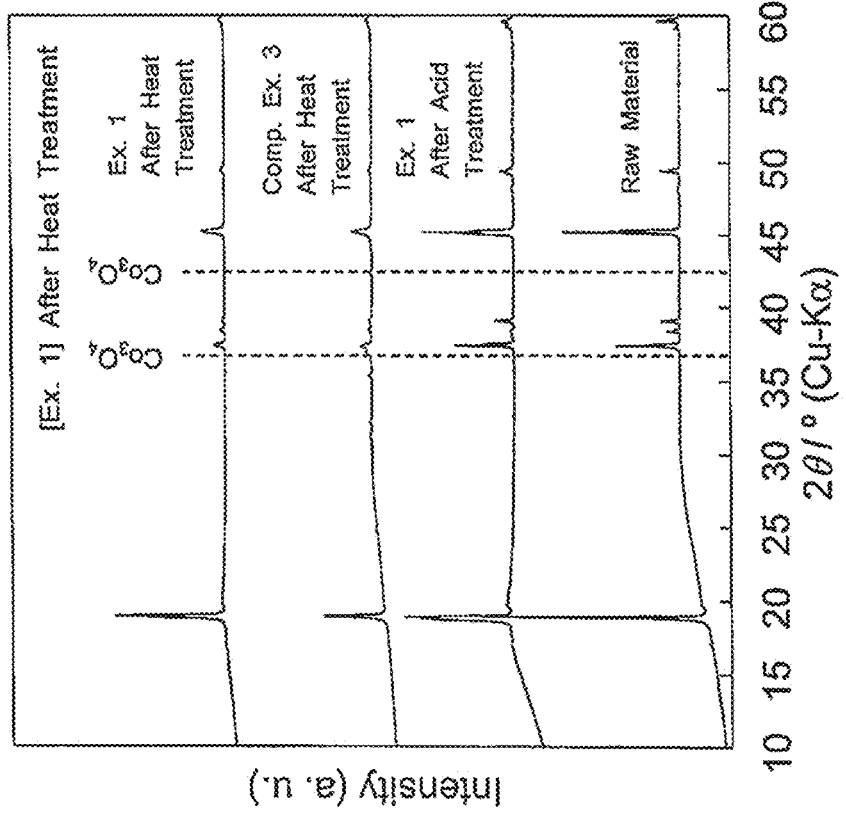

X-ray diffraction measurement was carried out using CuKα as a source for confirming crystalline phases included in the cathodes of the batteries according to Example 1 and Comparative Example 3. The results are shown in FIGS. 14A and 14B. FIG. 14A shows diffraction peaks in the whole range of the measurement, and FIG. 14B shows enlarged diffraction peaks derived from $Co_3O_4$. For reference, X-ray diffraction peaks of lithium cobaltate, which was raw material, and X-ray diffraction peaks of the cathode active material (after acid treatment) of Example 1 are shown together.

As shown in FIGS. 14A and 14B, no peak derived from $Co_3O_4$ was confirmed in the cathode, which was obtained by sintering the cathode active material according to Example 1. In contrast, peaks derived from $Co_3O_4$ were confined in the cathode, which was obtained by sintering the cathode active material according to Comparative Example 3.

(10) X-Ray Diffraction Measurement on Cathode Active Material

Figure 15A:
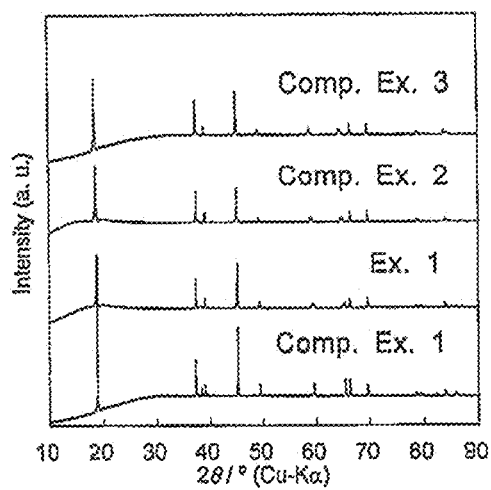
FIGS. 15A and 15B show results of X-ray diffraction measurement of cathode active material according to Example 1 and Comparative Examples 1 to 3.
Figure 15B:
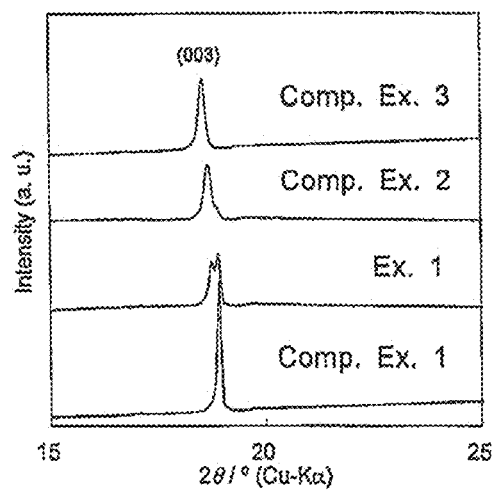

The cathode active material according to Example 1 and Comparative Examples 1 to 3 was subjected to X-ray diffraction measurement using CuKα as a source for confirming the cause of difference between the batteries according to Example 1 and Comparative Examples 1 to 3 in capacity and resistance. The results are shown in FIGS. 15A and 15B. FIG. 15A shows diffraction peaks in the whole range of the measurement, and FIG. 1B shows enlarged diffraction peaks according to a plane (003) of a layered rock-salt crystalline phase.

As shown in FIG. 15A, the cathode active material according to all the Example 1 and Comparative Examples 1 to 3 had the layered rock-salt crystalline phase, and no any other phase was confirmed therein. However, as shown in FIG. 15B, in the cathode active material of Example 1, two separate peaks derived from the same kind of crystal faces of the layered rock-salt crystalline phase were confirmed (both two peaks were the local maximums, and were convex upward), and two phases deferent in lattice constant included as the layered rock-salt crystalline phase, which was different from the cathode active material of Comparative Examples 1 to 3. This was applied to diffraction peaks other than those according to the plane (003) as well. As shown in FIG. 15B, as the amount of hydrochloric acid during acid treatment increased, diffraction peaks of the plane (003) shifted to the low angle side. This means that as the amount of hydrochloric acid during acid treatment increased, the amount of extracting lithium from layered rock salt lithium cobaltate to the acid solution (the amount of deficient lithium in the layered rock-salt crystalline phase) increased. That is, it is predicted that as a result of excessive extraction of lithium in the cathode active material of Comparative Examples 2 and 3 compared to that of Example 1, lithium cobaltate underwent thermal decomposition while sintering, and electrochemically inactive cobalt oxide formed as described above, to deteriorate the properties of the batteries. It can be said that extracting such a superb amount of lithium that two phases different in lattice constant are included as a layered rock-salt crystalline phase like the cathode active material of Example 1 lowers the sintering temperature of a cathode while thermal decomposition of the cathode active material is suppressed.

(11) Observing Crystalline Phase of Cathode Active Material

Figure 16A:
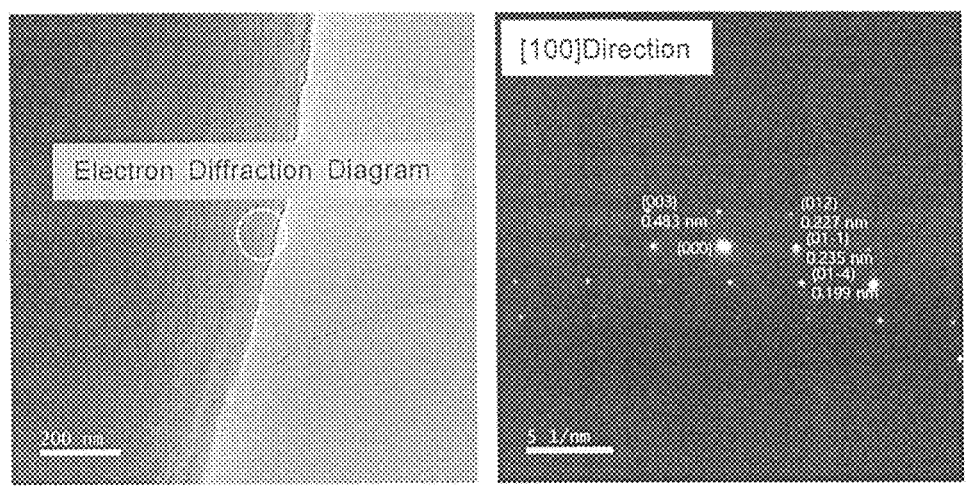
FIGS. 16A and 16B show TEM images and electron diffraction of cathode active material according to Example 1.
Figure 16B:
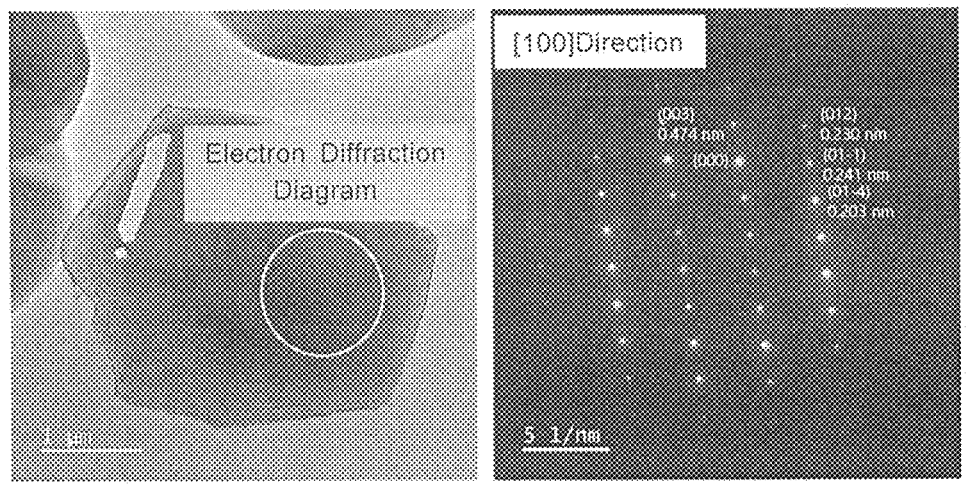

A crystalline phase included in the cathode active material according to Example 1, and lattice constants thereof were confirmed using electron diffraction with TEM. The results are shown in FIGS. 16A and 16B. FIG. 16A shows the results of a surface portion of its particle, and FIG. 16B shows the results inside the particle.

As shown in FIGS. 16A and 16B, the cathode active material of Example 1 kept the layered rock-salt crystalline phase from the surface portion of the particle to the inside thereof. The c-axis lattice constants of the layered rock-salt crystalline phase were calculated from electron diffraction diagrams. The lattice constants were 1.42 nm in the inside of the particle, and 1.45 nm in the surface portion of the particle. That is, a layered rock-salt crystalline structure expanded in the c-axis direction in the surface portion of the particle more than the inside of the particle. This means that the percentage of deficient lithium was larger in the layered rock-salt crystalline phase in the surface portion of the particle than that inside the particle. It can be said that a lithium deficiency is suppressed inside a particle while a surface portion of the particle, which contributes to sintering, is made to be much deficient in lithium as described above, which can lower the sintering temperature of a cathode while thermal decomposition of cathode active material is suppressed.

Examples show the case of using the solid electrolyte mixture of the oxide solid electrolyte and lithium nitrate (lithium compound of a low melting point) in the layer of the oxide solid electrolyte. The layer of the oxide solid electrolyte of this disclosure is not limited to this manner. It is believed that even if only the oxide solid electrolyte is used in the layer of the oxide solid electrolyte, the oxide solid electrolyte can be joined to the surface of the cathode while the cathode mixture is sintered at low temperature. In view of improving the sintering performance of the layer of the oxide solid electrolyte, the lithium compound of a low melting point is preferably included in the layer of the oxide solid electrolyte. From the same reason, an electrolyte where hydrogen is partially substituted for lithium is preferably used as the oxide solid electrolyte.

Examples show the case of including the solid electrolyte mixture (mixture of the oxide solid electrolyte and the lithium compound) in the cathode mixture. The cathode mixture of this disclosure is not limited to this manner. In the cathode mixture, the oxide solid electrolyte was included for more firmly joining the cathode to the layer of the oxide solid electrolyte. The oxide solid electrolyte does not influence the sintering ability of the cathode mixture itself. That is, even when just the lithium compound of a lower melting point than that of the cathode active material is included but the oxide solid electrolyte is not included in the cathode mixture of this disclosure, the cathode mixture can be sintered at low temperature.

In the Examples, lithium hydroxide also functioned as a neutralizer of an acid when the acid was generated when the cathode mixture and the solid electrolyte mixture were sintered.

(12) Producing Oxide Solid-State Batteries According to Examples 2 and 3, and Results of Evaluation of Performance Thereof An oxide solid-state battery according to Example 2 was obtained under the same conditions as Example 1 except that lithium hydroxide was not included in the cathode mixture.

An oxide solid-state battery according to Example 3 was obtained under the same conditions as Example 1 except that neither the solid electrolyte mixture nor lithium hydroxide was included but lithium nitrate was included in the cathode mixture.

The obtained oxide solid-state batteries were subjected to charge discharge testing in the same way as Example 1, to measure their battery capacities. The results are shown in FIG. 17.

Figure 17:
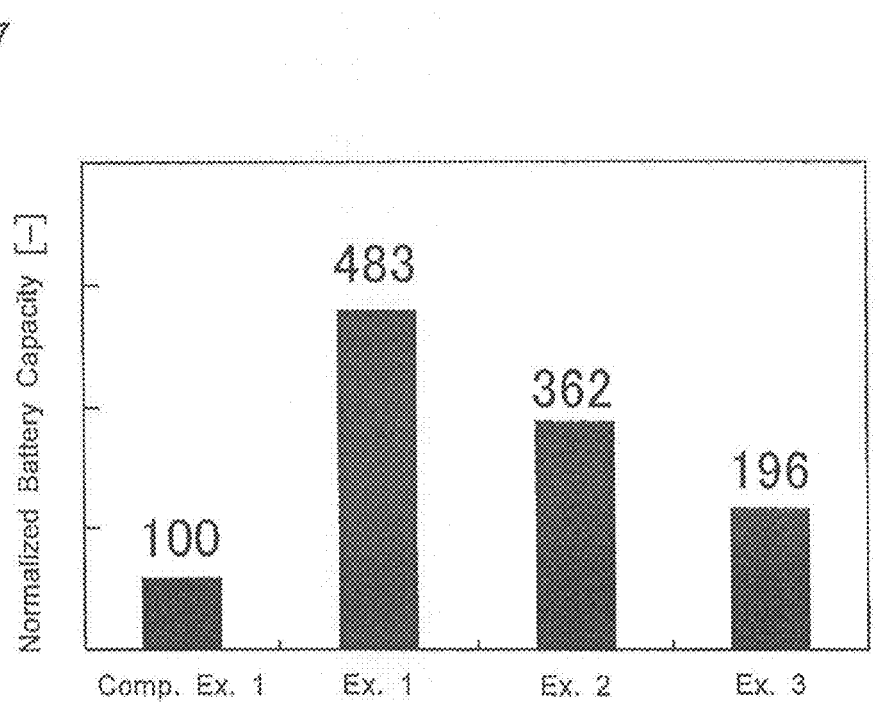
FIG. 17 shows capacities of batteries according to Examples 1 to 3 and Comparative Example 1.
Figure 18:
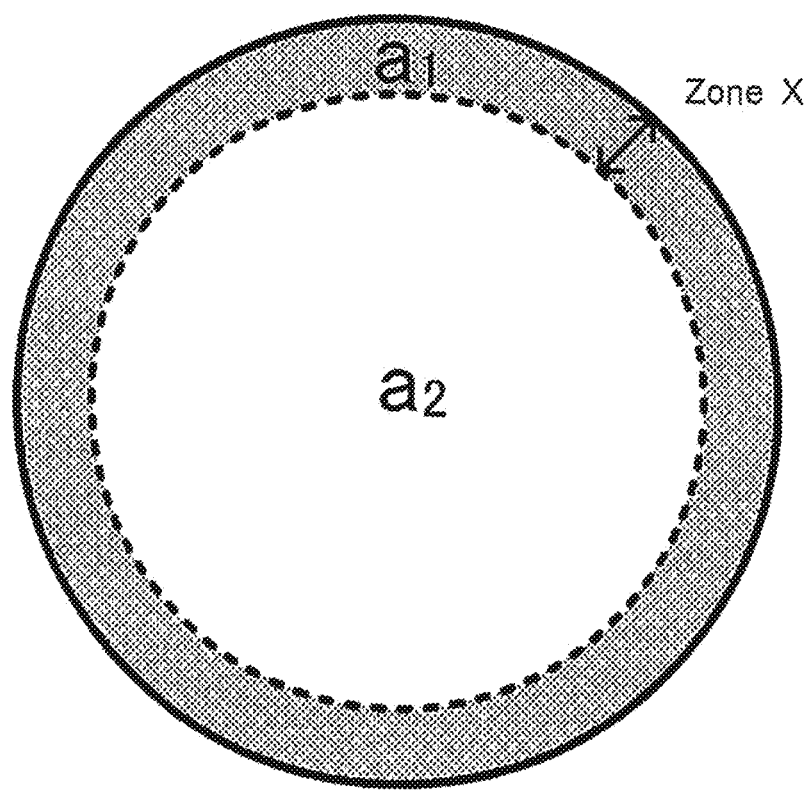
FIG. 18 is an explanatory schematic view of "surface portion of the particle".

As is apparent from the results shown in FIG. 17, the oxide solid-state batteries of Examples 2 and 3 had capacities of approximately 2 to 4 times as large as that of Comparative Example 1, and had excellent properties. It was found that the oxide solid electrolyte or lithium hydroxide is not always necessary in the cathode mixture, but only including the lithium compound of a low melting point makes it possible to sinter the cathode mixture at low temperature, and to produce the oxide solid-state battery of excellent properties. It was also found that in view of further improving the performance of the battery, the oxide solid electrolyte and/or a hydroxide is/are preferably included in the cathode mixture.

INDUSTRIAL APPLICABILITY

A cathode obtained by using the cathode active material and the cathode mixture of this disclosure has high sintered density, and high electronic conductivity. Thus, the cathode can be used as a cathode for various types of batteries. An oxide solid-state battery produced according to the producing method of this disclosure has a high capacity, and a low battery resistance, and further does not require any restraining member or the like for reducing interface resistance. Thus, the energy density s also high. Therefore, for example, the oxide solid-state battery can be used as an on-board large-sized power source.

REFERENCE SIGNS LIST

1' particle before contacted with an acid solution
1 cathode active material (particle after contacted with an acid solution)
2 lithium compound
3 cathode mixture
4 layer of an oxide solid electrolyte
5 laminate
6 anode material
10 cathode
20 layer of an oxide solid electrolyte
30 anode
100 oxide solid-state battery

What is claimed is:
1. A method for producing a cathode mixture, the method comprising:
contacting a particle of a lithium containing composite oxide having a layered rock-salt crystalline phase with an acid solution, and extracting lithium from a surface of the particle to the acid solution, to obtain a cathode active material that includes two phases different in lattice constant as the layered rock-salt crystalline phase, which means that two separate peaks which are derived from the same kind of the crystal faces of the layered rock-salt crystalline phase are confirmed, both two peaks are the local maximums, and are convex upward, when the particle is subjected to X-ray diffraction measurement;
mixing the cathode active material with a lithium compound whose melting point is lower than that of the cathode active material to obtain a cathode mixture; and
heating the cathode mixture at a temperature of no less than the melting point of the lithium compound and lower than 600° C., and sintering the cathode mixture at the temperature.

2. The method according to claim 1,
wherein a ratio (A1/B1) of a number of hydrogen ions included in the acid solution (A1) to a number of lithium atoms included in the particle before the particle is contacted with the acid solution (B1) is no more than 1/3.

3. The method according to claim 1,
wherein a ratio (B2/B1) of a number of lithium atoms included in the particle after the particle is contacted with the acid solution (B2) to a number of the lithium atoms included in the particle before the particle is contacted with the acid solution (B1) is no less than 0.9 and less than 1.0.

4. The method according to claim 1,
wherein the lithium compound is at least one selected from the group consisting of lithium nitrate, lithium formate, lithium acetate, and lithium hydroxide.

5. The method according to claim 1, wherein in said sintering the cathode mixture, the cathode mixture is heated either while or after pressurized.

6. The method according to claim 1, wherein
the lithium compound is at least one selected from the group consisting of lithium formate, and lithium acetate.

7. The method according to claim 1, wherein in said sintering the cathode mixture, the cathode mixture is heated while pressurized.

8. The method according to claim 1, wherein
a temperature at which the cathode mixture is heated is no more than 400° C.

9. A method for producing an oxide solid-state battery, comprising:
contacting a particle of a lithium containing composite oxide having a layered rock-salt crystalline phase with an acid solution, and extracting lithium from a surface of the particle to the acid solution, to obtain a cathode active material that includes two phases different in lattice constant as the layered rock-salt crystalline phase, which means that two separate peaks which are derived from the same kind of the crystal faces of the layered rock-salt crystalline phase are confirmed, both two peaks are the local maximums, and are convex upward, when the particle is subjected to X-ray diffraction measurement;
mixing the cathode active material with a lithium compound whose melting point is lower than that of the cathode active material, to obtain a cathode mixture;
layering a layer that consists of the cathode mixture, and a layer of an oxide solid electrolyte, to obtain a laminate; and
heating the laminate at a temperature of no less than the melting point of the lithium compound and lower than 600° C., and sintering the cathode mixture over a surface of the layer of the oxide solid electrolyte at the temperature.

10. The method according to claim 9, wherein
the oxide solid electrolyte includes garnet type lithium lanthanum zirconate.

11. The method according to claim 9,
wherein the lithium compound is at least one selected from the group consisting of lithium nitrate, lithium formate, lithium acetate, and lithium hydroxide.

12. The method according to claim 9,
wherein in said sintering the cathode mixture over a surface of the layer of the oxide solid electrolyte, the laminate is heated either while or after pressurized.

13. The method according to claim 9,
wherein the lithium compound is at least one selected from the group consisting of lithium formate, and lithium acetate.

14. The method according to claim 9,
wherein in said sintering the cathode mixture over a surface of the layer of the oxide solid electrolyte, the laminate is heated while pressurized.

15. The method according to claim 9, wherein
a temperature at which the laminate is heated is no more than 400° C.

* * * * *